United States Patent
Nie et al.

(10) Patent No.: US 12,498,843 B2
(45) Date of Patent: Dec. 16, 2025

(54) DISPLAY OF BOOK SECTION-SPECIFIC FULLSCREEN RECOMMENDATIONS FOR DIGITAL READERS

(71) Applicant: Beijing Bytedance Network Technology Co., Ltd., Beijing (CN)

(72) Inventors: Huijing Nie, Beijing (CN); Jian Wu, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 77 days.

(21) Appl. No.: 18/572,002

(22) PCT Filed: Aug. 9, 2022

(86) PCT No.: PCT/CN2022/111182
§ 371 (c)(1),
(2) Date: Dec. 19, 2023

(87) PCT Pub. No.: WO2023/035835
PCT Pub. Date: Mar. 16, 2023

(65) Prior Publication Data
US 2024/0295949 A1    Sep. 5, 2024

(30) Foreign Application Priority Data
Sep. 8, 2021   (CN) .......................... 202111048853.9

(51) Int. Cl.
*G06F 3/0483*   (2013.01)
*G06F 3/0481*   (2022.01)
(Continued)

(52) U.S. Cl.
CPC .......... *G06F 3/0483* (2013.01); *G06F 3/0486* (2013.01); *G06F 3/0481* (2013.01); *H04M 1/72454* (2021.01)

(58) Field of Classification Search
None
See application file for complete search history.

(56) References Cited

U.S. PATENT DOCUMENTS 6,462,752 B1    10/2002   Ma et al.
7,359,944 B2 *   4/2008   An ..................... G06Q 30/0242
                                                          709/206
(Continued)

FOREIGN PATENT DOCUMENTS

CN    101763792 A    6/2010
CN    107209916 A    9/2017
(Continued)

OTHER PUBLICATIONS

Office Action received for Chinese Patent Application No. 202111048853.9, mailed on Feb. 28, 2025, 14 pages (7 pages of English Translation and 7 pages of Original Document).
(Continued)

*Primary Examiner* — Gabriel Mercado
(74) *Attorney, Agent, or Firm* — Astute IP Law Group

(57) ABSTRACT

The embodiments of the disclosure relates to a method, apparatus, device and medium for information presentation, wherein the method includes: receiving an update instruction for a first text in a reader, the first text being a part of a target book content; and updating the first text based on the target book content, and in response to the first text meeting a predetermined condition, presenting recommendation information in a full screen mode in the reader; wherein the predetermined condition is determined based on text feature information of the first text. Using the above technical solution, during the updating of the text of the book content presented in the reader, the recommendation information can (Continued)

be presented in the full screen mode when it is determined that the text meets the predetermined condition based on the text feature information.

20 Claims, 6 Drawing Sheets

(51) Int. Cl.
*G06F 3/0486* (2013.01)
*H04M 1/72454* (2021.01)

(56) References Cited

U.S. PATENT DOCUMENTS

| | | | |
|---|---|---|---|
| 8,631,356 B2 * | 1/2014 | Lai | G06Q 30/0251 715/835 |
| 2002/0042914 A1 * | 4/2002 | Walker | H04H 60/73 725/32 |
| 2012/0084150 A1 | 4/2012 | Nussel et al. | |
| 2012/0150655 A1 | 6/2012 | Seth et al. | |
| 2012/0151351 A1 | 6/2012 | Kilroy et al. | |

FOREIGN PATENT DOCUMENTS

| | | | |
|---|---|---|---|
| CN | 107657470 | A | 2/2018 |
| CN | 108122134 | A | 6/2018 |
| CN | 109101162 | A | 12/2018 |
| CN | 110109590 | A | 8/2019 |
| CN | 110263285 | A | 9/2019 |
| CN | 110781431 | A | 2/2020 |
| CN | 111369296 | A | 7/2020 |
| CN | 113741773 | A | 12/2021 |
| JP | 2012053284 | A | 3/2012 |

OTHER PUBLICATIONS

International Search Report (with English translation) and Written Opinion issued in PCT/CN2022/111182, dated Oct. 27, 2022, 10 pages provided.

Office Action issued in corresponding Chinese Application No. 202111048853.9, dated Dec. 29, 2023, with machine translation, 12 pages provided.

* cited by examiner

DISPLAY OF BOOK SECTION-SPECIFIC FULLSCREEN RECOMMENDATIONS FOR DIGITAL READERS

CROSS REFERENCE TO RELATED APPLICATION(S)

The present disclosure claims priority to Chinese Patent Application No. 202111048853.9, filed on Sep. 8, 2021 and entitled "METHOD, APPARATUS, DEVICE AND MEDIUM FOR INFORMATION PRESENTATION", the contents of which are hereby incorporated by reference in its entirely.

FIELD

The present disclosure relates to the field of information processing technologies, and in particular to a method, apparatus, device, and medium for information presentation.

BACKGROUND

With the development of Internet technologies, it is a common way to increase an amount of interaction by presenting recommendation information in related products.

Currently, when presenting the recommendation information in some book contents, the presentation frequency often affects the presentation of normal contents and the user's reading experience.

SUMMARY

In order to solve the above technical problems or at least partially solve the above technical problems, the present disclosure provides a method, apparatus, device, and medium for information presentation.

Embodiments of the present disclosure provide a method for information presentation, the method comprising:
  receiving an update instruction for a first text in a reader, the first text being a part of a target book content; and
  updating the first text based on the target book content, and in response to the first text meeting a predetermined condition, presenting recommendation information in a full screen mode in the reader;
  wherein the predetermined condition is determined based on text feature information of the first text.

The embodiments of the present disclosure also provide an apparatus for information presentation, the apparatus comprising:
  an update module configured to receive an update instruction for first text in a reader, the first text being a part of target book content; and
  a recommendation information module configured to update the first text based on the target book content, and in response to the first text meeting a predetermined condition, present recommendation information in a full screen mode in the reader.

The present disclosure further provides an electronic device, the electronic device comprising: a processor; a memory for storing instructions that are executable by the processor; the processor being configured to read the executable instructions from the memory and execute the instructions to implement the method for information presentation as provided in the embodiments of the present disclosure.

The embodiments of the present disclosure also provide a computer-readable storage medium, wherein the storage medium has a computer program stored therein, the computer program being configured to perform the method for information presentation as provided in the embodiments of the present disclosure.

Compared with the prior art, the technical solution provided by the embodiments of the present disclosure has the following advantages: the solution for information presentation provided by the embodiments of the present disclosure receives an update instruction for a first text in a reader, the first text being a part of a target book content; and updates the first text based on the target book content, and in response to the first text meeting a predetermined condition, presents recommendation information in a full screen mode in the reader; wherein the predetermined condition is determined based on text feature information of the first text. Using the above technical solution, during the updating of the text of the book content presented in the reader, the recommendation information can be presented in the full screen mode when it is determined that the text meets the predetermined condition based on the text feature information. The presentation frequency of the recommendation information can be controlled based on the predetermined condition, which not only improves the exposure rate and click rate of the recommendation information, but also reduces the impact on the book content presentation, thereby improving the user's reading experience effect.

BRIEF DESCRIPTION OF DRAWINGS

In conjunction with the accompanying drawings and with reference to the following detailed description, the above and other features, advantages and aspects of the various embodiments of the present disclosure will become more apparent. Throughout the drawings, like or similar reference numbers denote like or similar elements. It should be understood that the drawings are illustrative and that components and elements are not necessarily drawn to scale.

DETAILED DESCRIPTION

Embodiments of the present disclosure are described in more detail with reference to the drawings below. Although certain embodiments of the present disclosure are shown in the accompanying drawings, it should be understood that the present disclosure may be implemented in various forms and should not be interpreted as limited to the embodiments set forth herein. Instead, these embodiments are provided for a more thorough and complete understanding of the present disclosure. It should be understood that the drawings and embodiments of the present disclosure are for illustrative purposes only and are not intended to limit the scope of protection of the disclosure.

It should be understood that the various steps described in the method implementations of the present disclosure may be performed in a different sequence and/or in parallel. In addition, the method implementations may include additional steps and/or omit the steps shown in the performance. The scope of this disclosure is not limited in this respect.

The term "including" as used herein and its variants are openly inclusive, i.e., "including but not limited to." The term "based" is "based at least in part." The term "one embodiment" means "at least one embodiment"; the term "another embodiment" means "at least one additional embodiment"; the term "some embodiments" means "at least some embodiments". Relevant definitions of other terms are given in the description below.

It should be noted that references to "first", "second" and other concepts in this disclosure are used only to distinguish between different apparatuses, modules or units and are not used to define the sequence or interdependence of functions performed by such apparatuses, modules or units.

It should be note that references to the modifications of "one" and "a plurality of" in this disclosure are indicative rather than restrictive and should be understood by those skilled in the art to mean "one or more" unless expressly stated otherwise in the context.

The names of messages or information interacted among a plurality of apparatuses in implementations of this disclosure are used only for illustrative purposes and are not intended to limit the scope of such messages or information.

Figure 1:
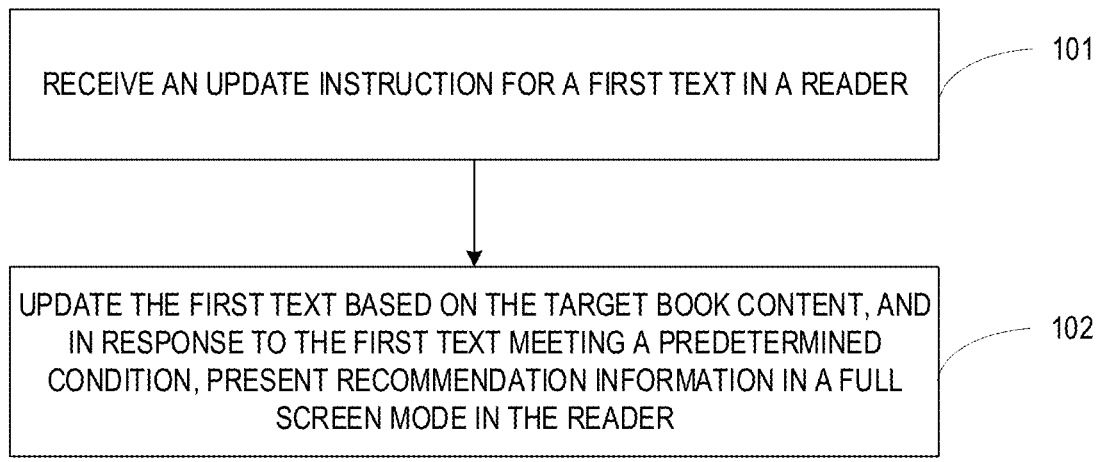
FIG. 1 is a schematic flow diagram of a method for information presentation provided by embodiments of the present disclosure.

FIG. 1 is a schematic flow diagram of a method for information presentation provided by embodiments of the present disclosure, which can be performed by an apparatus for information presentation, wherein the apparatus can be implemented in software and/or hardware and can generally be integrated in an electronic device. As shown in FIG. 1, the method comprises:

Step 101: receiving an update instruction for a first text in a reader.

The reader herein can be any device that can read text, such as a mobile phone, computer, etc. The first text can be the text currently presented in the reader, which belongs to a part of a target book content. The target book content can be a book content currently being read in the reader, and the specifics are not limited. The update instruction can be used to update the content currently presented in the reader.

In the embodiments of the present disclosure, the apparatus for information presentation may present the first text in the target book content in the reader and receive the update instruction for the first text. The specific form of the update instruction is not limited to, for example, when a trigger operation on the first text by a user is detected, it can be determined that the update instruction has been received. The above trigger operation may include a gesture control operation, a voice control operation, etc., and is not limited in detail.

Step 102: updating the first text based on the target book content, and in response to the first text meeting a predetermined condition, presenting recommendation information in a full screen mode in the reader.

The predetermined condition herein may be determined based on the text feature information of the first text. The text feature information may be a feature extracted from the first text, for example, the text feature information may include a degree of plot importance t and a position in the target book content.

Specifically, after receiving the update instruction for the first text in the reader, the apparatus for information presentation can determine a text after the first text based on the target book content and present the text in the reader. During the updating of the first text, it can simultaneously determine whether the first text meets the predetermined condition. If so, the recommendation information can be present in the full screen mode in the reader; otherwise, the first text can be continued to update.

In some embodiments, the text feature information comprises a degree of plot importance; and the apparatus for information presentation can determine that the first text meets the predetermined condition by: determining a target degree of plot importance of the first text; and determining that the first text meets the predetermined condition based on the target degree of plot importance.

Optionally, determining a target degree of plot importance of the first text comprises: determining an interaction ratio of an amount of interaction data of the first text to a total amount of interaction data of the target book content as the target degree of plot importance. Optionally, determining that the first text meets the predetermined condition based on the target degree of plot importance comprises: in accordance with a determination that the interaction ratio is lower than a predetermined ratio threshold, determining that the first text meets the predetermined condition.

The degree of plot importance herein can be understood as whether the plot of a part of the text is important and how important it is in the entire book content. The amount of interaction data can be a statistical amount of interaction operations by the user and the interaction operations can include comments, likes, and other operations, and the specifics are not limited.

Specifically, the apparatus for information presentation can determine the amount of interaction data of the first text and the total amount of interaction data of the target book content and calculate the interaction ratio of the amount of interaction data of the first text to the total amount of interaction data of the target book content, and determine the interaction ratio as the target degree of plot importance. For example, if the amount of interaction data of the first text is a and the total amount of interaction data of the target book content is b, the interaction ratio can be a/b. Afterwards, the apparatus for information presentation can compare the interaction ratio with a predetermined ratio threshold. If the interaction ratio is less than the predetermined ratio threshold, it can be determined that the first text meets the predetermined condition.

In other embodiments, the text feature information may comprise a position in the target book content, and the target book content includes a plurality of chapters; and the apparatus for information presentation can determine that the first text meets the predetermined condition by: in accordance with a determination that the position of the first text in the target book content is at an end of a predetermined chapter, determining that the first text meets the predetermined condition.

The text feature information of the first text can refer to the specific position of the first text in the target book content, for example, the first text is some chapter in the target book content. Chapters can be part of the target book content, and the target book content can be divided into a plurality of chapters, each of which can also be divided into a plurality of sections, without limitation.

The apparatus for information presentation can determine the specific position of the first text in the target book content. If the specific position is at the end of a predetermined chapter, it can determine that the first text meets the predetermined condition. The above predetermined chapter can be predetermined based on an actual situation. For example, the predetermined chapter can be chapters in the target book content that are strongly associated with the recommendation information.

In still other embodiments, the apparatus for information presentation can determine that the first text meets the predetermined condition by: in accordance with a determination that a reading duration on the first text by a user is greater than or equal to a predetermined duration, determining that the first text meets the predetermined condition.

The predetermined duration herein can be predetermined based on an actual situation, for example, the predetermined duration can be 3 minutes. The reading duration can be the reading duration on the first text by a user. Specifically, the apparatus for information presentation can determine the reading duration on the first text by a user and compare the reading duration with the predetermined duration. When the reading duration is greater than or equal to the predetermined duration, it can be determined that the first text meets the predetermined condition.

In the embodiments of the present disclosure, presenting recommendation information in a full screen mode in the reader comprises: sliding a recommendation page into the reader until the recommendation page is presented in the full screen mode, and presenting the recommendation information in the recommendation page. Optionally, sliding a recommendation page into the reader until the recommendation page is presented in the full screen mode comprises dynamically sliding the recommendation page based on an update direction of the first text, and gradually covering the reader with the recommendation page during the sliding until the recommendation page is presented in the full screen mode.

The update direction of the first text herein can be a closing direction or an entry direction of the new text of the first text when replacing the presented first text with a new text. For example, the update direction of the first text can be from bottom to top or from left to right, etc. The recommendation page can be a page other than the present page used to present the book content in reading scenarios, and the recommendation page is used to present recommendation information.

Specifically, when presenting the recommendation information in the full screen mode in the reader, the apparatus for information presentation can dynamically slide the recommendation page from the update direction of the first text, that is, slide into the reader, and gradually cover the first text presented in the reader with the recommendation page during the sliding and crease the sliding until the recommendation page is presented in the full screen mode.

For example, when the recommendation information is a recommendation video, the update direction of the first text is from below to top, and the recommendation page surface slides into the reader from below, and the recommendation video is played after the recommendation page covers the target page. The above dynamic presentation of the recommendation page reduces the abrupt feeling of pop-up and improves the user experience.

Figure 2:
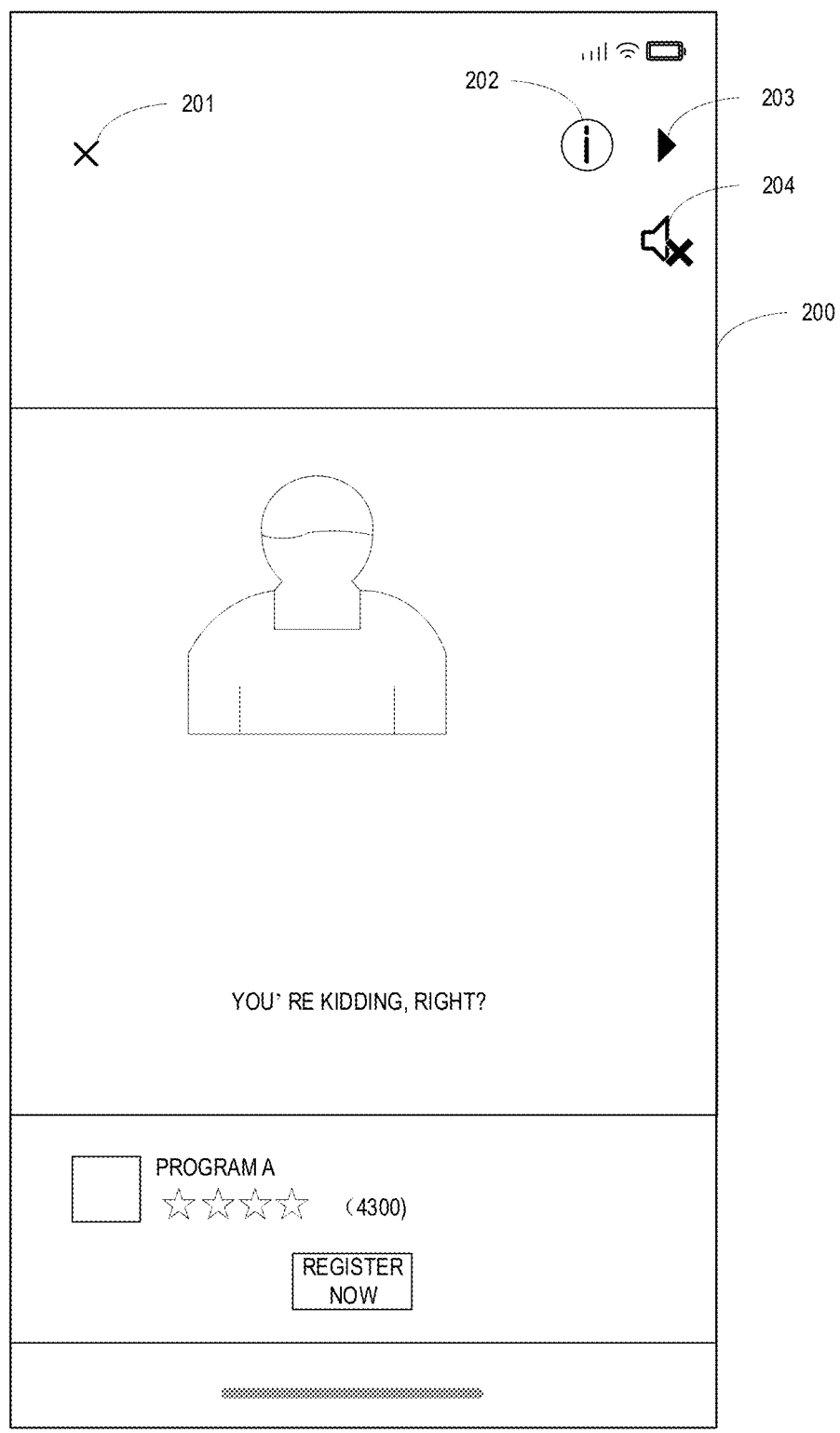
FIG. 2 is a schematic diagram of a recommendation information presentation provided by the embodiments of the present disclosure.

For example, FIG. 2 is a schematic diagram of a recommendation information presentation provided by the embodiments of the present disclosure. As shown in FIG. 2, the recommendation page 200 is shown in the figure. The recommendation page 200 shows a recommendation video in the full screen mode, the recommendation video including a character and subtitles "You're kidding, right?", and the recommendation page 200 also shows a program A related to the recommendation video and related information of the program A. The rating of the program A in the figure is 4 stars, and the download volume of the program A is 4300. The bottom of the recommendation page further shows a button "Register Now", which can be triggered by the user to register with the program A. The top of the recommendation page 200 further shows function buttons, including a close button 201, a details button 202, a playback control button 203, and a sound control button 204 in the figure. When the user triggers the function buttons, the corresponding function can be executed.

The information presentation scheme provided by the embodiments of the present disclosure receives an update instruction for a first text in a reader, the first text being a part of a target book content; and updates the first text based on the target book content, and in response to the first text meeting a predetermined condition, presents recommendation information in a full screen mode in the reader; wherein the predetermined condition is determined based on text feature information of the first text. Using the above technical solution, during the updating of the text of the book content presented in the reader, the recommendation information can be presented in the full screen mode when it is determined that the text meets the predetermined condition based on the text feature information. The presentation frequency of the recommendation information can be controlled based on the predetermined condition, which not only improves the exposure rate and click rate of the recommendation information, but also reduces the impact on the book content presentation, thereby improving the user's reading experience effect.

In some embodiments, after the first text meets the predetermined condition, the method further can comprise: presenting the recommendation information in a predetermined display region of the reader, the predetermined display region being arranged in a wrap-around pattern with the first text.

The predetermined display region herein may be a region predetermined in the reader for presenting the recommendation information, and the position and size of the predetermined display region may be predetermined based on the actual situation, which is not limited by the embodiments of the present disclosure. Moreover, the predetermined display region may be arranged in the wrap-around pattern with the first text. After determining that the first text meets the predetermined condition, the apparatus for information presentation can present the recommendation information in the predetermined display region of the reader. Since the predetermined display region is arranged in the wrap-around pattern with the first text, the first text may be arranged in the wrap-around pattern with the recommendation information and be presented.

Figure 3:
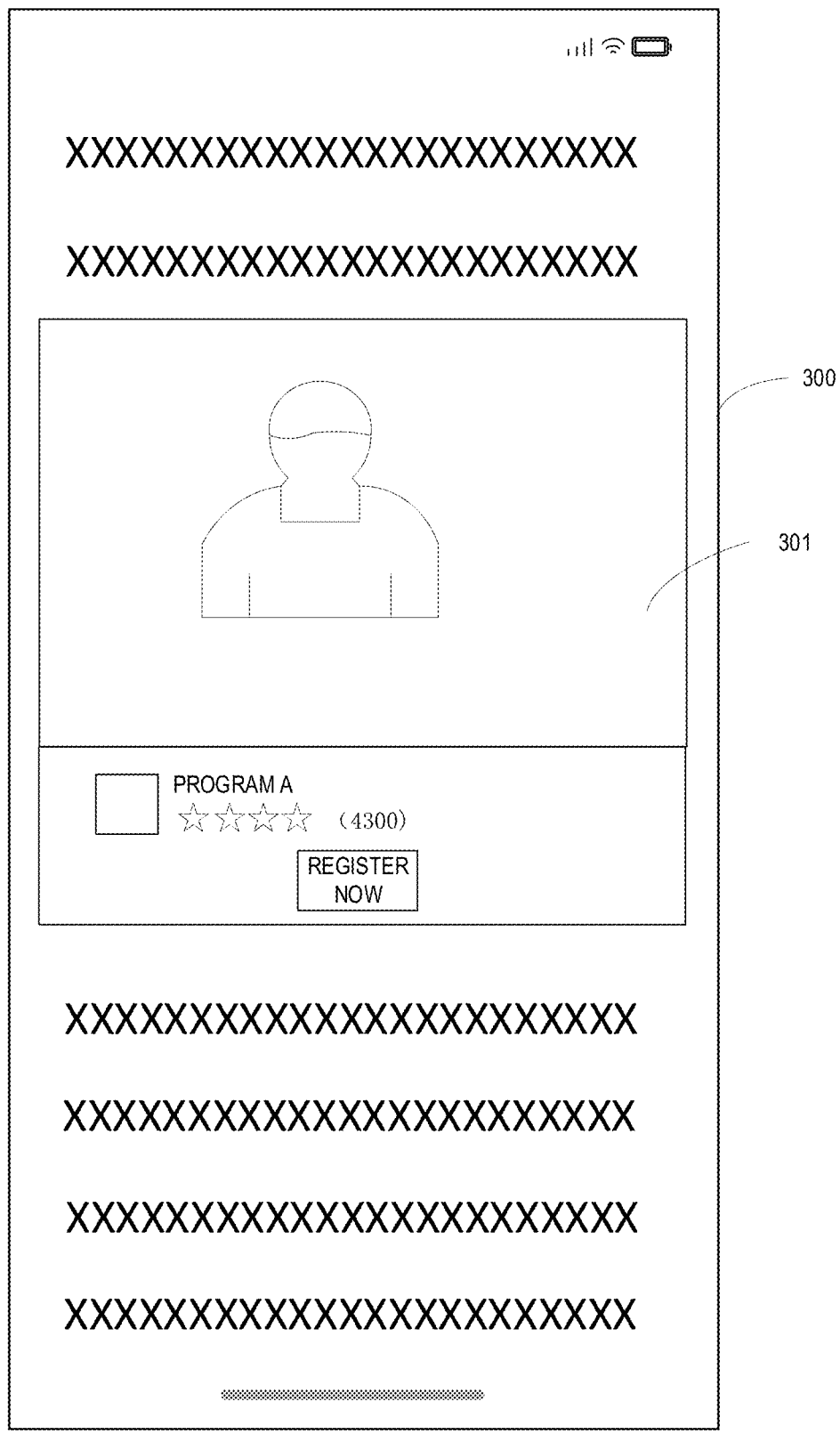
FIG. 3 is a schematic diagram of another recommendation information presentation provided by the embodiments of the present disclosure.

For example, FIG. 3 is a schematic diagram of another recommendation information presentation provided by the embodiments of the present disclosure. As shown in FIG. 3, a current present interface 300 of the reader is shown in the figure. The present interface 300 may include a predetermined display region 301, and the predetermined display region 301 in the figure shows a recommendation information, and the first text is presented around the recommendation information. As shown in FIG. 3, the first text is presented above and below the recommendation information. It can be understood that when the predetermined display region 301 is set small in FIG. 3, the first text can also be presented to the left and right of the recommendation information.

In the above scheme, the recommendation information can not only be presented in the full screen mode in the reader, but also can be arranged in the wrap-around pattern with the presented text, which improves the diversity and richness of the presentation of the recommendation information and enhances the user's viewing experience.

In some embodiments, after updating the first text based on the target book content, the method may further comprise: in accordance with a determination that the first text is updated to a second text, presenting prompt information, wherein the prompt information is used to prompt the presenting of the recommendation information, and the second text is located before the first text that meets the predetermined condition, with a first predetermined number of characters between the second text and the first text that meets the predetermined condition. Optionally, the presenting prompt information may comprise sliding, based on a predetermined direction, the prompt information into a predetermined position in the reader for presentation, the predetermined direction being a direction from a first boundary of the reader to a second boundary of the reader, and the first boundary being arranged opposite to the second boundary.

The second text herein can be a text that is closer to the first text that meets the predetermined condition, with the first predetermined number of characters between the second text and the first text that meets the predetermined condition. The first predetermined number can be predetermined based on the actual situation. For example, the first predetermined number can be the number of characters presented on a page of the reader. Because the numbers of characters presented on a page of different readers are different, the first predetermined number can be different for different readers.

During the updating of the first text based on the target book content, when the first text is updated to the second text, that is, when the second text is presented in the reader, the apparatus for information presentation can present the prompt information for prompting the recommendation information. Specifically, dynamic or static presentation modes are used when presenting the prompt information. When the dynamic presentation mode is used, the prompt information can be dynamically slid into a predetermined position of the reader based on the predetermined direction and presented to the user. The predetermined position can be predetermined based on the actual situation. For example, the predetermined position can be the bottom position of the reader. The above predetermined direction can also be determined as needed. For example, the predetermined direction can be from the bottom boundary to the upper boundary, from the left boundary to the right boundary, or from the right boundary to the left boundary.

Figure 4:
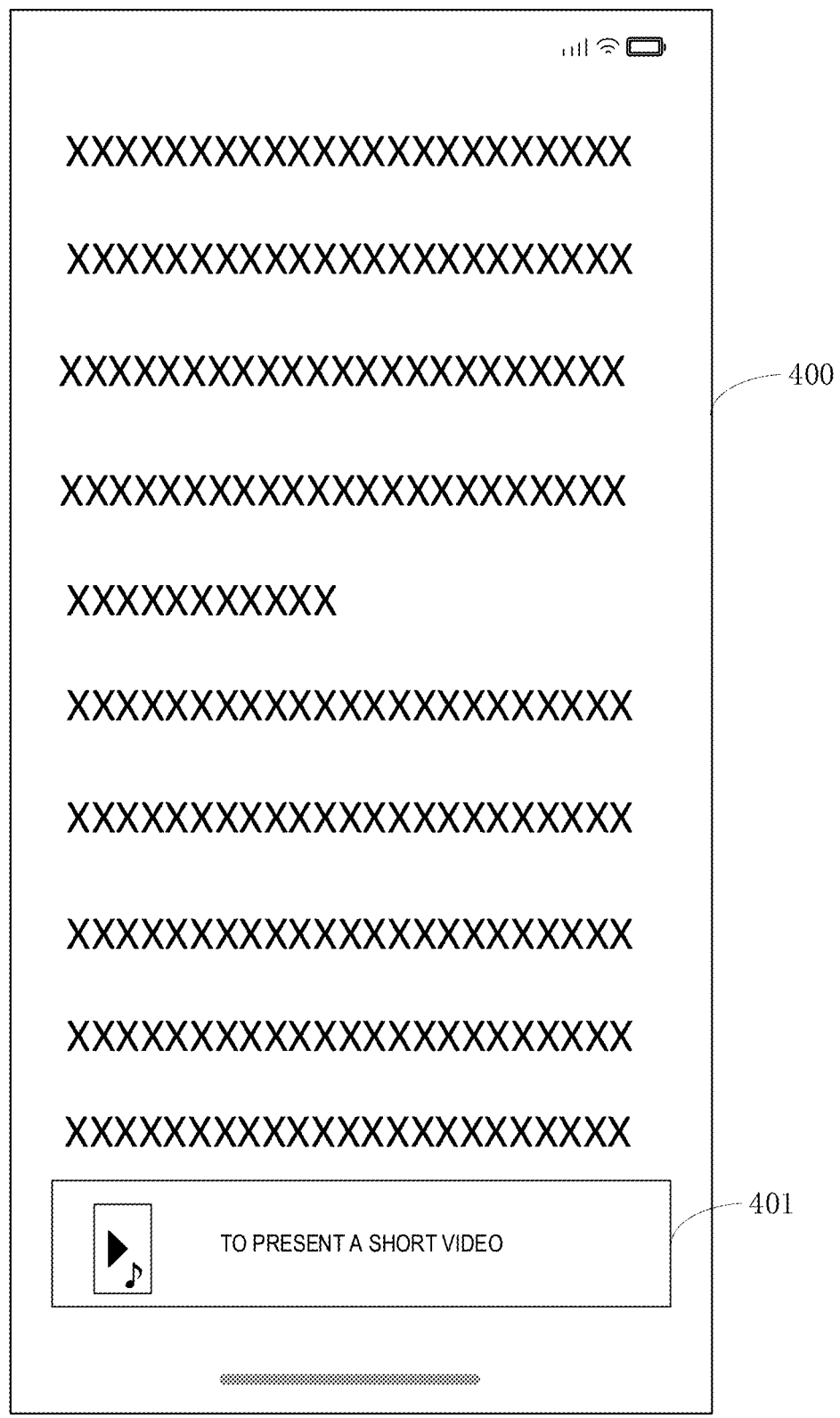
FIG. 4 is a schematic diagram of a prompt information provided by the embodiments of the present disclosure.

For example, FIG. 4 is a schematic diagram of a prompt information provided by the embodiments of the present disclosure. As shown in FIG. 4, a present interface 400 of the reader is shown. The present interface 400 presents the prompt information 401, and the prompt information 401 in the figure may include a prompt icon and a prompt text, the prompt text is "to present a short video". The prompt information 401 can remind the user about to show a recommendation video, so that the user has an operation expectation.

In the above scheme, by setting prompt information, the presentation of subsequent recommendation information is prompted, so that users have an operation expectation. The abrupt feeling of the recommendation information presentation is reduced, and thus the exposure rate and click rate of recommendation information is improved.

In some embodiments, the method for information presentation may further comprise when receiving a closing instruction for the prompt information or a time for the presentation of the prompt information reaches a prompt time, the prompt information is closed. The prompt time herein can be predetermined based on the actual situation. For example, the prompt time can be 3 seconds. When the apparatus for information presentation receives the closing instruction based on a triggering operation on the prompt information by the user, or when the time for the presentation of the prompt information reaches the prompt time, the prompt information can be closed. The above-mentioned prompt information is closed, to avoid the obstruction of the reading content and the impact on the user's reading while prompting the user and improve the user's reading experience.

Figure 5:
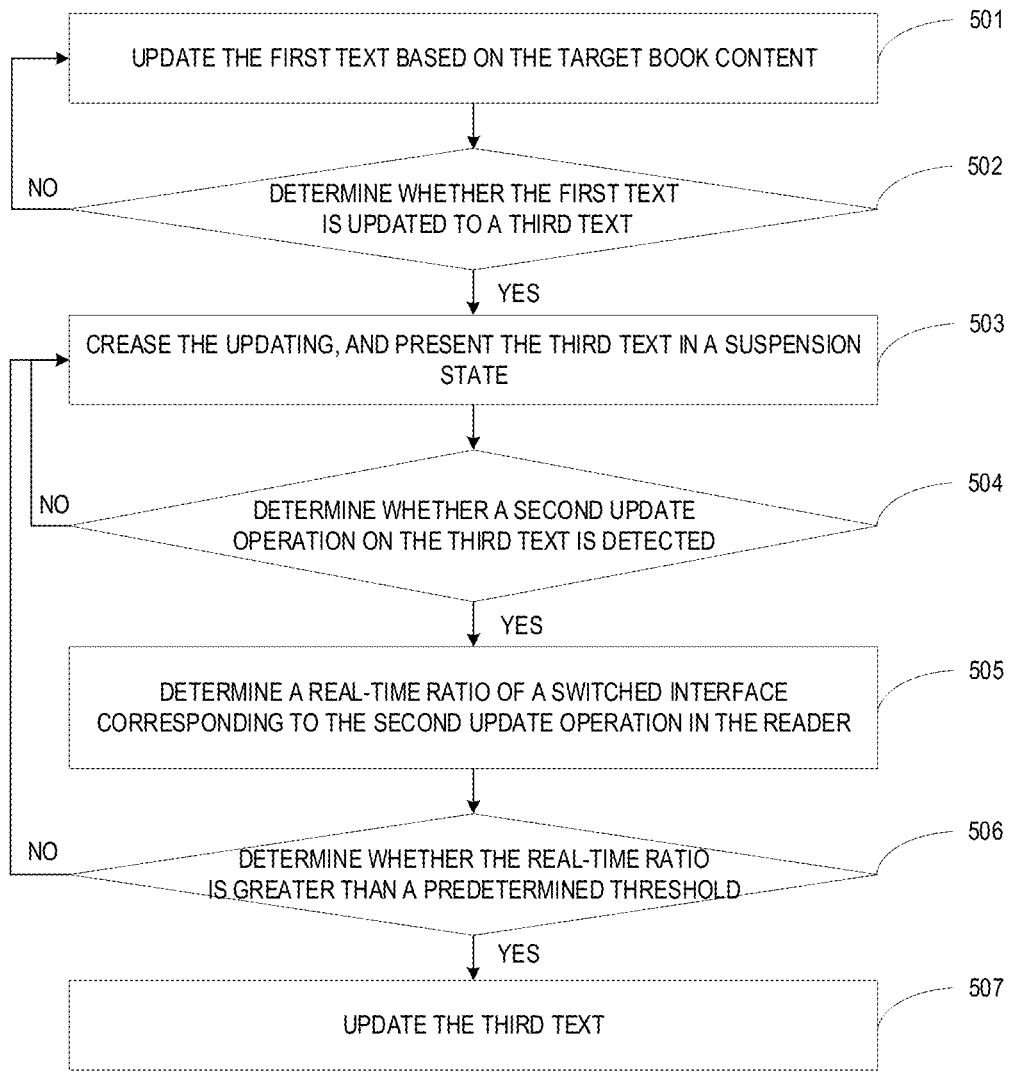
FIG. 5 is a flow diagram of another method for information presentation provided by the embodiments of the present disclosure.

FIG. 5 is a flow diagram of another method for information presentation provided by the embodiments of the present disclosure. As shown in FIG. 5, based on the above embodiment, the method for information presentation may further include the following steps:

Step 501: updating the first text based on the target book content.

Step 502: determining whether the first text is updated to a third text. If so, execute step 503; otherwise, return to step 501.

A position of the third text in the target book content herein is at an end of each chapter.

Specifically, during the updating of the first text based on the target book content, when the first text is updated to the third text, that is, when the third text is presented in the reader, the apparatus for information presentation can execute step 503; otherwise, return to step 501.

Step 503: creasing the updating, and presenting the third text in a suspension state.

The suspension state refers to suspending in the current presentation interface with respect to an update operation for the text. If the user no longer performs the trigger operation, it will remain in this state.

Specifically, the apparatus for information presentation creases updating when the first text is updated to the third text, and then keeps the third text in the suspension state for presentation. Since the third text can be the text at the end of each chapter in the target book content, user's perception of updates between different chapters can be enhanced and reading fluency can be improved by presenting in the suspension state.

Step 504: determining whether a second update operation on the third text is detected. If so, execute step 505; otherwise, return to step 503.

The second update operation herein can be understood as an update operation performed on the third text in the above-mentioned suspension state. Since the first text is updated to the third text, an update operation has already been performed on the third text, here it is a second update operation.

After creasing the updating and presenting the third text in a suspension state, the apparatus for information presentation can determine whether a second update operation on the third text is detected. If so, execute step 505. Otherwise, return step 503.

Step 505: determining a real-time ratio of a switched interface corresponding to the second update operation in the reader.

The switched interface herein can be a newly presented interface corresponding to the current display interface, and the real-time ratio of the switched interface can be understood as the ratio of the display area of the switched interface to the display area of the reader. Since the display area of the switched interface can gradually increase under the second updating operation, the real-time ratio of the switched interface also gradually increases.

After detecting the second update operation on the third text, the information display device can obtain the real-time ratio of the switched interface corresponding to the second update operation in reading.

Step 506: determine whether the real-time ratio is greater than a predetermined threshold, if so, execute step 507; otherwise, return to step 503.

The predetermined threshold herein can be a threshold of the ratio of the display area of the switched interface to the display area of the reader, which can be predetermined based on the actual situation, for example, the predetermined threshold can be 10%.

The apparatus for information display can compare the real-time ratio of the switched interface with the predetermined threshold. If the real-time ratio is greater than the predetermined threshold, execute step 507; otherwise, return to step 503.

Step 507: updating the third text.

Specifically, when determining that the real-time ratio is greater than the predetermined threshold, the apparatus for information display can update the third text based on the target book content and display the updated text. The above determination of the real-time ratio can avoid user mistouch and improve the accuracy of updating the text.

In the above scheme, by suspending the text at the end of the chapters, a dynamic mode is used to prompt users that text updates between different chapters are about to be made, which strengthens users' perception of text updates between different chapters; and after the text is suspended, text updates are only performed when the real-time ratio of the user updated switched interface reaches the threshold, which further improves the perception of text updates between different chapters, improves reading fluency, and optimizes reading experience.

In some embodiments, the method for information display may further comprise: in accordance with a determination that the first text is updated to a fourth text, decelerating the updating, wherein the fourth text is located before the first text that meets the predetermined condition, with a second predetermined number of characters between the fourth text and the first text that meets the predetermined condition, and/or wherein the fourth text is located before the third text, with a third predetermined number of characters between the third text and the fourth text.

The fourth text herein can be a text before the first text that meets the predetermined condition with a closer distance, which can be the same as the second text or different from the second text, that is, the second predetermined number can be the same as the first predetermined number or different from the second predetermined number, depending on the actual situation. And/or, the fourth text can be a text before the third text that meets the predetermined condition with a closer distance, with a third predetermined number of characters between the third text and the fourth text. The third predetermined number can be predetermined based on the actual situation, and the details are not limited.

During the updating of the first text based on the target book content, when the first text is updated to the fourth text, that is, when the fourth text is displayed in the reader, the apparatus for information presentation represents that the first text that meets the predetermined condition is to be updated to, and/or the fourth text located at the end of each chapter in the target book content is to be updated to. At this time, the update operation can be evenly decelerated to prompt the user in a dynamic way that the recommendation information is to be displayed or the text between different chapters is to be updated.

In the above scheme, by decelerating the performance of text updates, the user's perception of the recommendation information that is to be displayed is strengthened. When displaying recommendation information on this basis, the abrupt feeling of popping up is mitigate, thereby improving the exposure rate and click rate of recommendation information. Moreover, the user's perception of text updates between different chapters is strengthened. When the update is a page turning operation, the perception of page turning between different chapters is improved. The reading fluency is improved, and the reading experience is optimized.

In some embodiments, after presenting recommendation information in a full screen mode in the reader, the method for information presentation may further comprises in accordance with a determination that the recommendation information meets a presentation ending condition, continuing to update the first text based on the target book content.

The presentation ending condition herein refers to the condition used to determine whether to close the recommendation information and can also refer to the condition used to determine whether to continue the performance of text update. Specifically, after the recommendation information is displayed in the full screen mode in the reader, when it is determined that the recommendation information meets the presentation ending condition, the recommendation information can be closed and the first text can be updated based on the target book content, that is, a text after the first text is displayed after the recommendation information is closed. Optionally, the above closed recommendation information can be dynamically slid out based on the update direction of the first text until the recommendation information leaves the reader.

Optionally, determining that the recommendation information meets the presentation ending condition may comprise: receiving a closing instruction for the recommendation information; and/or, in accordance with a determination that the recommendation information is a recommendation video and playing of the recommendation video is finished; and/or, in accordance with a determination that the recommendation information is predetermined information and a time for presenting the recommendation information reaches a predetermined time, wherein the predetermined information is a recommendation text and/or a recommendation image.

When a trigger operation on the close button arranged on the recommendation page where the recommendation information is located by the user is detected, the close instruction for the recommendation information is received, and it is determined that the recommendation information meets the presentation ending condition. When the recommendation information is a recommendation video and the play of the current recommendation video is finished, it can be determined that the recommendation information meets the presentation ending condition. When the recommendation information is not a recommendation video, but a recommendation text and/or a recommendation image, and the time for presenting the recommendation information reaches the predetermined time, it can be determined that the recommendation information meets the presentation ending condition. The predetermined time can be predetermined based on the actual situation, for example, the predetermined time can be predetermined to 3 seconds.

In the above scheme, after displaying the recommendation information, when the recommendation information meets the presentation ending condition, the recommendation information can be closed and subsequent text update operations can be continued, further improving the user's reading experience.

For example, assuming that the target book content is a novel, the text update operation is a page turning operation, and the scenario is to optimize the advertising experience under the novel reader. The first text meets the predetermined condition and is on the last page of a chapter of the novel. Before displaying the advertisement, when updating to the second text on the third-to-last page of the chapter, an advertisement entry prompt can appear from bottom to top. The second text is located before the first text, with a first predetermined number of characters between the second text and the first text. The prompt can be manually slid off by the user or automatically turned off within 3 seconds and cause the user to have an operational expectation. Assuming that the update operation on the first text is a page turning operation, during the turning of the last page of the chapter, the advertisement can be slid into the field and be played after arriving the top. Once the playing is finished or clicked to be closed, the advertisement is slid up and out of the page, and the overall advertisement and the chapter page of the novel reader are integrated to reduce the interruption of user reading; and during the turning of page, when the first text is updated to the fourth text, the update can be decelerated, and the fourth text is located before the first text with a second predetermined number of characters between the fourth text and the first text, which migrates the abrupt feeling of the advertisement popping up; after the advertisement is finished, the text of the first page of the next chapter can be directly displayed to reduce the interruption of reading.

Assuming the scenario is an advertisement-free reading optimization under a novel reader, when there are no advertisements, when the first text is updated to the third text that is at the end of the last page of any chapter of the novel, a page turning operation is performed based on the user's trigger operation, that is, the last page of the chapter can be dragged to directly enter the first page of the next chapter. During the turning of page, the page turning can be creased, and the third text of the last page can be displayed in a suspension state. When a second page turning operation on the third text is detected, the third text can be updated based on the real-time ratio of the switched interface corresponding to the second page turning operation, that is, entering the first page of the next chapter. In addition, the above fourth text can also be a text before the third text with a closer distance, and the fourth text is located before the third text with a third predetermined number of characters between the third text and the fourth text. When the first text is updated to the fourth text before the third text, the update can also be decelerated to prompt the user that text updates between different chapters are to be performed dynamically. That is to say, when sliding quickly to update the presented text, the fourth text near the end of the chapter can be evenly decelerated; when it stays at the bottom of the chapter, the user needs to drag and drop again to make the real-time ratio of the switched interface greater than 10% before turning the page, which strengthens the user's perception of turning pages between chapters and improves the user's reading experience.

This scheme addresses the experience problem of pop-up recommendation information in the book content of the reader, improves the smoothness of reading experience, improves the exposure rate and click rate of recommendation information, and plays a key role in the overall retention of the reader.

Figure 6:
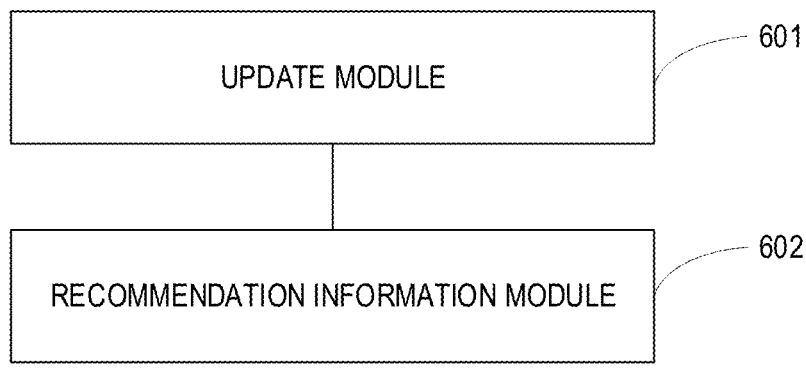
FIG. 6 is a schematic diagram of the structure of an apparatus for information presentation provided by the embodiments of the present disclosure.

FIG. 6 is a schematic diagram of the structure of an apparatus for information presentation provided by the embodiments of the present disclosure, which can be implemented by software and/or hardware and can generally be integrated into an electronic device. As shown in FIG. 6, the apparatus comprises: an update module 601 configured to receive an update instruction for first text in a reader, the first text being a part of target book content; and a recommendation information module 602 configured to update the first text based on the target book content, and in response to the first text meeting a predetermined condition, present recommendation information in a full screen mode in the reader.

Optionally, the text feature information comprises a degree of plot importance; the recommendation information module 602 comprises a first condition unit, and the first condition unit comprises: a first subunit configured to determine a target degree of plot importance of the first text; and a second subunit configured to determine that the first text meets the predetermined condition based on the target degree of plot importance.

Optionally, the first subunit is configured to determine an interaction ratio of an amount of interaction data of the first text to a total amount of interaction data of the target book content as the target degree of plot importance.

Optionally, the second subunit is configured to, in accordance with a determination that the interaction ratio is lower than a predetermined ratio threshold, determine that the first text meets the predetermined condition.

Optionally, the text feature information comprises a position in the target book content, and the target book content comprises a plurality of chapters; the recommendation information module 602 comprises a second condition unit, and the second condition unit is configured to, in accordance with a determination that the position of the first text in the target book content is at an end of a predetermined chapter, determine that the first text meets the predetermined condition.

Optionally, the recommendation information module 602 comprises a third condition unit, and the third condition unit is configured to, in accordance with a determination that a reading duration on the first text by a user is greater than or equal to a predetermined duration, determine that the first text meets the predetermined condition.

Optionally, the recommendation information module 602 comprises a presentation unit configured to slide a recommendation page into the reader until the recommendation page is presented in the full screen mode and present the recommendation information in the recommendation page.

Optionally, the presentation unit is configured to dynamically slide the recommendation page based on an update direction of the first text, and gradually cover the reader with the recommendation page during the sliding until the recommendation page is presented in the full screen mode.

Optionally, the apparatus further comprises an information presentation module configured to after the first text meets the predetermined condition, present the recommendation information in a predetermined display region of the reader, the predetermined display region being arranged in a wrap-around pattern with the first text.

Optionally, the apparatus further comprises a prompt module configured to, after updating the first text based on the target book content, in accordance with a determination that the first text is updated to a second text, present prompt information, wherein the prompt information is used to prompt the presenting of the recommendation information, and the second text is located before the first text that meets the predetermined condition, with a first predetermined number of characters between the second text and the first text that meets the predetermined condition.

Optionally, the prompt module is specifically configured to slide, based on a predetermined direction, the prompt information into a predetermined position in the reader for presentation, the predetermined direction being a direction from a first boundary of the reader to a second boundary of the reader, and the first boundary being arranged opposite to the second boundary.

Optionally, the apparatus further comprises a suspension module configured to, in accordance with a determination that the first text is updated to a third text, crease the updating, and present the third text in a suspension state, wherein a position of the third text in the target book content is at an end of each chapter.

Optionally, the apparatus further comprises a deceleration module configured to, in accordance with a determination that the first text is updated to a fourth text, decelerate the updating, wherein the fourth text is located before the first text that meets the predetermined condition, with a second predetermined number of characters between the fourth text and the first text that meets the predetermined condition, and/or wherein the fourth text is located before the third text, with a third predetermined number of characters between the third text and the fourth text.

Optionally, the apparatus further comprises a second update module configured to after presenting the third text in a suspension state, in accordance with a detection of a second update operation on the third text, determine a real-time ratio of a switched interface corresponding to the second update operation in the reader; and in accordance with a determination that the real-time ratio is greater than a predetermined threshold, update the third text.

Optionally, the apparatus further comprises a presentation ending module configured to, after presenting recommendation information in a full screen mode in the reader, in accordance with a determination that the recommendation information meets a presentation ending condition, continue to update the first text based on the target book content.

Optionally, the presentation ending module is configured to receive a closing instruction for the recommendation information; and/or, in accordance with a determination that the recommendation information is a recommendation video and playing of the recommendation video is finished; and/or, in accordance with a determination that the recommendation information is predetermined information and a time for presenting the recommendation information reaches a predetermined time, wherein the predetermined information is a recommendation text and/or a recommendation image.

The apparatus for information display disclosed in the embodiments of the present disclosure may perform the method for information display provided by any embodiment of the present disclosure, with functional modules and beneficial effects corresponding to the performance of the method.

The embodiments of the present disclosure further provide a computer program product, comprising computer programs/instructions that, when executed by a processor, implement the method for information display provided by any embodiment of the present disclosure.

Figure 7:
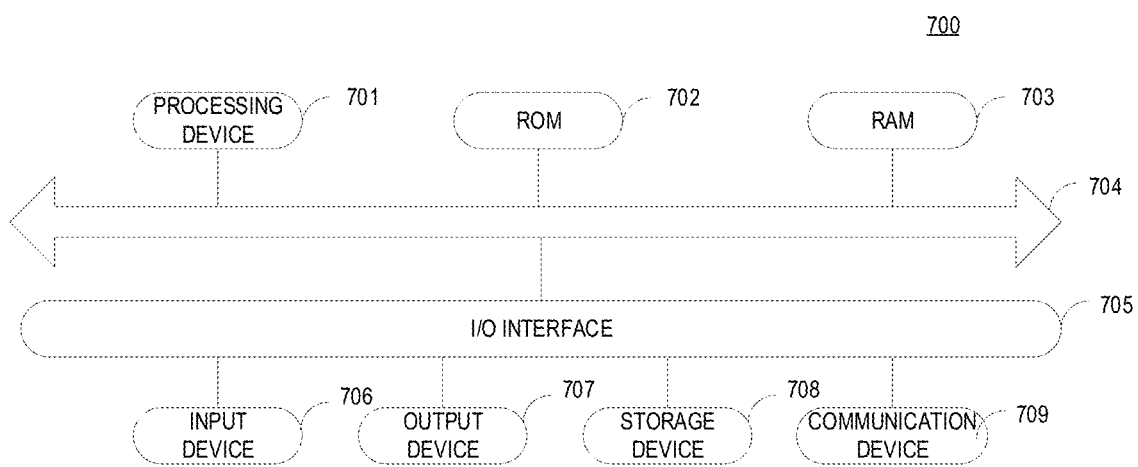
FIG. 7 is a schematic diagram of the structure of an electronic device provided by the embodiments of the present disclosure of the disclosure.

FIG. 7 is a schematic diagram of the structure of an electronic device provided by the embodiments of the present disclosure of the disclosure. With specific reference to FIG. 7 below, FIG. 7 shows a schematic diagram of the structure suitable for implementing the electronic device 700 in the embodiments of the present disclosure. The electronic device 700 in the embodiments of the present disclosure may include but is not limited to mobile terminals such as mobile phones, laptops, digital broadcast receivers, PDAs (personal digital assistants), PAD (tablet computers), PMPs (portable multimedia players), car terminals (such as car navigation terminals), and fixed terminals such as digital TVs, desktop computers, etc. The electronic device shown in FIG. 7 is only an example and should not bring any limitations on the functionality and scope of use of the embodiments of the present disclosure.

As shown in FIG. 7, the electronic device 700 may include a processing device (such as a central processor, graphics processing unit, etc.) 701, which can perform various appropriate actions and processes based on programs stored in a read-only memory (ROM) 702 or loaded from a storage device 708 into a random-access memory (RAM) 703. In RAM 703, various programs and data required for the operation of the electronic device 700 are also stored. The processing device 701, ROM 702, and RAM 703 are connected to each other through a bus 704. The input/output (I/O) interface 705 is also connected to the bus 704.

Typically, the following devices can be connected to the I/O interface 705 including input devices 706, such as touch screens, touchpads, keyboards, mice, cameras, microphones, accelerometers, gyroscopes, etc.; output devices 707, such as liquid crystal displays (LCDs), speakers, vibrators, etc.; storage devices 708, such as magnetic tapes, hard disks, etc.; and communication devices 709. Communication devices 709 can allow electronic devices 700 to communicate wirelessly or wirelessly with other devices to exchange data. Although FIG. 7 shows electronic devices 700 with various devices, it should be understood that it is not required to implement or have all of the devices shown. More or fewer devices can be implemented or provided instead.

In particular, according to embodiments of the present disclosure, the process described above with reference to the flowchart may be implemented as a computer software program. For example, embodiments of the present disclosure include a computer program product comprising a computer program carried on a non-transitory computer-readable medium, the computer program comprising program code for performing the method shown in the flowchart. In such embodiments, the computer program may be downloaded and installed from the network via the communication device 709, or is installed from the storage device 708, or is installed from the ROM 702. When the computer program is executed by the processing device 701, the above-described functions defined in the method for information presentation of the embodiments of the present disclosure are performed.

It should be noted that the computer-readable medium described above in this disclosure can be a computer-readable signal medium or a computer-readable storage medium or any combination thereof. The computer-readable storage medium can be, for example, but not limited to, an electrical, magnetic, optical, electromagnetic, infrared, or semiconductor system, device, or any combination thereof. More specific examples of computer-readable storage media can include but are not limited to: an electrical connection with one or more wires, a portable computer disk, a hard disk, random access memory (RAM), read-only memory (ROM), erasable programmable read-only memory (EPROM or flash memory), optical fibers, portable compact disk read-only memory (CD-ROM), optical storage devices, magnetic storage devices, or any suitable combination thereof. In this disclosure, a computer-readable storage medium can be any tangible medium containing or storing a program that can be used by or in conjunction with an instruction execution system, device, or device. In this disclosure, a computer-readable signal medium can include a data signal propagated in a baseband or as part of a carrier wave, which carries computer-readable program code. Such propagated data signals can take many forms, including but not limited to electromagnetic signals, optical signals, or any suitable combination thereof. Computer-readable signal media can also be any computer-readable medium other than computer-readable storage media, which can send, propagate, or transmit programs for use by or in conjunction with instruction execution systems, devices, or devices. The program code contained on the computer-readable medium can be transmitted using any suitable medium, including but not limited to: wires, optical cables, RF (radio frequency), etc., or any suitable combination thereof.

In some embodiments, the client and server may communicate using any currently known or future developed network protocol such as HTTP (Hypertext Transfer Protocol) and may be interconnected with any form or medium of digital data communication (e.g., a communication network). Examples of communication networks include local area networks ("LANs"), wide area networks ("WANs"), the Internet (e.g., the Internet), and end-to-end networks (e.g., ad hoc end-to-end networks), as well as any currently known or future developed networks.

The computer-readable medium can be included in the electronic device, or it can exist alone without being assembled into the electronic device.

The computer-readable medium carries one or more programs, and when the one or more programs are executed by the electronic device, the electronic device: receives an update instruction for a first text in a reader, the first text being a part of a target book content; and updates the first text based on the target book content, and in response to the first text meeting a predetermined condition, presenting recommendation information in a full screen mode in the reader; wherein the predetermined condition is determined based on text feature information of the first text.

The computer program code for performing the operations of the present disclosure may be written in one or more programming languages, or combinations thereof, including but not limited to Object Oriented programming languages such as Java, Smalltalk, C++, and also including conventional procedural programming languages such as "C" language or similar programming languages. The program code may be executed entirely on the user's computer, partially on the user's computer, as a standalone software package, partially on the user's computer, or entirely on a remote computer or server. In the case of a remote computer, the remote computer may be connected to the user's computer through any type of network, including a local area network (LAN) or a wide area network (WAN), or may be connected to an external computer (e.g., using an Internet service provider to connect via the Internet).

The flowcharts and block diagrams in the accompanying drawings illustrate the architecture, functions, and operations of systems, methods, and computer program products that may be implemented in accordance with various embodiments of the present disclosure. in this regard, each block in the flowchart or block diagram may represent a module, program segment, or portion of code that contains one or more executable instructions for implementing a specified logical function. It should also be noted that in some alternative implementations, the functions marked in the blocks may also occur in a different order than those marked in the figures. For example, two blocks represented in succession may actually be executed substantially in parallel, and they may sometimes be executed in reverse order, depending on the function involved. It should also be noted that each block in the block diagram and/or flowchart, and combinations of blocks in the block diagram and/or flowchart, may be implemented using a dedicated hardware-based system that performs the specified function or operation, or may be implemented using a combination of dedicated hardware and computer instructions.

Described in the embodiments of the present disclosure relates to the disclosed unit may be implemented by way of software, may be implemented by way of hardware, wherein the name of the unit does not constitute a limitation on the unit itself in some cases.

The functions described above herein may be performed at least in part by one or more hardware logic components. For example, without limitation, example types of hardware logic components that may be used include field programmable gate arrays (FPGAs), application specific integrated circuits (ASICs), application specific standard products (ASSPs), system-on-chip (SOCs), complex programmable logic devices (CPLDs), and the like.

In the context of this disclosure, machine-readable media can be tangible media that can contain or store programs for use by or in conjunction with instruction execution systems, devices, or devices. Machine-readable media can be machine-readable signal media or machine-readable storage media. Machine-readable media can include, but are not limited to, electronic, magnetic, optical, electromagnetic, infrared, or semiconductor systems, devices, or devices, or any suitable combination thereof. More specific examples of machine-readable storage media may include electrical connections based on one or more wires, portable computer disks, hard disks, random access memory (RAM), read-only memory (ROM), erasable programmable read-only memory (EPROM or flash memory), optical fibers, convenient compact disk read-only memory (CD-ROM), optical storage devices, magnetic storage devices, or any suitable combination thereof.

According to one or more embodiments of the present disclosure, the present disclosure provides a method for information presentation, comprising: receiving an update instruction for a first text in a reader, the first text being a part of a target book content; and updating the first text based on the target book content, and in response to the first text meeting a predetermined condition, presenting recommendation information in a full screen mode in the reader; wherein the predetermined condition is determined based on text feature information of the first text.

According to one or more embodiments of the present disclosure, in the method for information presentation provided by the present disclosure, the text feature information comprises a degree of plot importance; and the method further comprises determining that the first text meets the predetermined condition by: determining a target degree of plot importance of the first text; and determining that the first text meets the predetermined condition based on the target degree of plot importance.

According to one or more embodiments of the present disclosure, in the method for information presentation provided by the present disclosure, determining a target degree of plot importance of the first text comprises determining an interaction ratio of an amount of interaction data of the first text to a total amount of interaction data of the target book content as the target degree of plot importance.

According to one or more embodiments of the present disclosure, in the method for information presentation provided by the present disclosure, determining that the first text meets the predetermined condition based on the target degree of plot importance comprises: in accordance with a determination that the interaction ratio is lower than a predetermined ratio threshold, determining that the first text meets the predetermined condition.

According to one or more embodiments of the present disclosure, in the method for information presentation provided by the present disclosure, the text feature information comprises a position in the target book content, and the target book content comprises a plurality of chapters; and the method further comprises determining that the first text meets the predetermined condition by: in accordance with a determination that the position of the first text in the target book content is at an end of a predetermined chapter, determining that the first text meets the predetermined condition.

According to one or more embodiments of the present disclosure, in the method for information presentation provided by the present disclosure, the method further comprises determining that the first text meets the predetermined condition by: in accordance with a determination that a reading duration on the first text by a user is greater than or equal to a predetermined duration, determining that the first text meets the predetermined condition.

According to one or more embodiments of the present disclosure, in the method for information presentation provided by the present disclosure, presenting recommendation information in a full screen mode in the reader comprises: sliding a recommendation page into the reader until the recommendation page is presented in the full screen mode, and presenting the recommendation information in the recommendation page.

According to one or more embodiments of the present disclosure, in the method for information presentation provided by the present disclosure, sliding a recommendation page into the reader until the recommendation page is presented in the full screen mode comprises: dynamically sliding the recommendation page based on an update direction of the first text, and gradually covering the reader with the recommendation page during the sliding until the recommendation page is presented in the full screen mode.

According to one or more embodiments of the present disclosure, in the method for information presentation provided by the present disclosure, after the first text meets the predetermined condition, the method further comprises: presenting the recommendation information in a predetermined display region of the reader, the predetermined display region being arranged in a wrap-around pattern with the first text.

According to one or more embodiments of the present disclosure, in the method for information presentation provided by the present disclosure, after updating the first text based on the target book content, the method further comprises: in accordance with a determination that the first text is updated to a second text, presenting prompt information, wherein the prompt information is used to prompt the presenting of the recommendation information, and the second text is located before the first text that meets the predetermined condition, with a first predetermined number of characters between the second text and the first text that meets the predetermined condition.

According to one or more embodiments of the present disclosure, in the method for information presentation provided by the present disclosure, the presenting prompt information comprises: sliding, based on a predetermined direction, the prompt information into a predetermined position in the reader for presentation, the predetermined direction being a direction from a first boundary of the reader to a second boundary of the reader, and the first boundary being arranged opposite to the second boundary.

According to one or more embodiments of the present disclosure, in the method for information presentation provided by the present disclosure, the method further comprises: in accordance with a determination that the first text is updated to a third text, creasing the updating, and presenting the third text in a suspension state, wherein a position of the third text in the target book content is at an end of each chapter.

According to one or more embodiments of the present disclosure, in the method for information presentation provided by the present disclosure, the method further comprises: in accordance with a determination that the first text is updated to a fourth text, decelerating the updating, wherein the fourth text is located before the first text that meets the predetermined condition, with a second predetermined number of characters between the fourth text and the first text that meets the predetermined condition, and/or wherein the fourth text is located before the third text, with a third predetermined number of characters between the third text and the fourth text.

According to one or more embodiments of the present disclosure, in the method for information presentation provided by the present disclosure, after presenting the third text in a suspension state, the method further comprises: in accordance with a detection of a second update operation on the third text, determining a real-time ratio of a switched interface corresponding to the second update operation in the reader; and in accordance with a determination that the real-time ratio is greater than a predetermined threshold, updating the third text.

According to one or more embodiments of the present disclosure, in the method for information presentation provided by the present disclosure, after presenting recommendation information in a full screen mode in the reader, the method further comprises: in accordance with a determination that the recommendation information meets a presentation ending condition, continuing to update the first text based on the target book content.

According to one or more embodiments of the present disclosure, in the method for information presentation provided by the present disclosure, determining that the recommendation information meets an ending presentation condition comprises: receiving a closing instruction for the recommendation information; and/or, in accordance with a determination that the recommendation information is a recommendation video and playing of the recommendation video is finished; and/or, in accordance with a determination that the recommendation information is predetermined information and a time for presenting the recommendation information reaches a predetermined time, wherein the predetermined information is a recommendation text and/or a recommendation image.

According to one or more embodiments of the present disclosure, the present disclosure provides an apparatus for information presentation comprising: an update module configured to receive an update instruction for first text in a reader, the first text being a part of target book content; and a recommendation information module configured to update the first text based on the target book content, and in response to the first text meeting a predetermined condition, present recommendation information in a full screen mode in the reader.

According to one or more embodiments of the present disclosure, in the apparatus for information presentation provided in the present disclosure, the text feature information comprises a degree of plot importance; the recommendation information module comprises a first condition unit, and the first condition unit comprises: a first subunit configured to determine a target degree of plot importance of the first text; and a second subunit configured to determine that the first text meets the predetermined condition based on the target degree of plot importance.

According to one or more embodiments of the present disclosure, in the apparatus for information presentation provided in the present disclosure, the first subunit is configured to: determine an interaction ratio of an amount of interaction data of the first text to a total amount of interaction data of the target book content as the target degree of plot importance.

According to one or more embodiments of the present disclosure, in the apparatus for information presentation provided in the present disclosure, the second subunit is configured to: in accordance with a determination that the interaction ratio is lower than a predetermined ratio threshold, determine that the first text meets the predetermined condition.

According to one or more embodiments of the present disclosure, in the apparatus for information presentation provided in the present disclosure, the text feature information comprises a position in the target book content, and the target book content comprises a plurality of chapters; the recommendation information module comprises a second condition unit, and the second condition unit is configured to: in accordance with a determination that the position of the first text in the target book content is at an end of a predetermined chapter, determine that the first text meets the predetermined condition.

According to one or more embodiments of the present disclosure, in the apparatus for information presentation provided in the present disclosure, the recommendation information module comprises a third condition unit, the third condition unit is configured to: in accordance with a determination that a reading duration on the first text by a user is greater than or equal to a predetermined duration, determine that the first text meets the predetermined condition.

According to one or more embodiments of the present disclosure, in the apparatus for information presentation provided in the present disclosure, the recommendation information module comprises a presentation unit, the presentation unit be configured to: slide a recommendation page into the reader until the recommendation page is presented in the full screen mode and present the recommendation information in the recommendation page.

According to one or more embodiments of the present disclosure, in the apparatus for information presentation provided in the present disclosure, the presentation unit is configured to: dynamically slide the recommendation page based on an update direction of the first text, and gradually cover the reader with the recommendation page during the sliding until the recommendation page is presented in the full screen mode.

According to one or more embodiments of the present disclosure, in the apparatus for information presentation provided in the present disclosure, the apparatus further comprises an information presentation module configured to, after the first text meets the predetermined condition, present the recommendation information in a predetermined display region of the reader, the predetermined display region being arranged in a wrap-around pattern with the first text.

According to one or more embodiments of the present disclosure, in the apparatus for information presentation provided in the present disclosure, the apparatus further comprises a prompt module configured to, after updating the first text based on the target book content, in accordance with a determination that the first text is updated to a second text, present prompt information, wherein the prompt information is used to prompt the presenting of the recommendation information, and the second text is located before the first text that meets the predetermined condition, with a first predetermined number of characters between the second text and the first text that meets the predetermined condition.

According to one or more embodiments of the present disclosure, in the apparatus for information presentation provided in the present disclosure, the prompt module is specifically configured to: slide, based on a predetermined direction, the prompt information into a predetermined position in the reader for presentation, the predetermined direction being a direction from a first boundary of the reader to a second boundary of the reader, and the first boundary being arranged opposite to the second boundary.

According to one or more embodiments of the present disclosure, in the apparatus for information presentation provided in the present disclosure, the apparatus further comprises a suspension module configured to, in accordance with a determination that the first text is updated to a third text, crease the updating, and presenting the third text in a suspension state, wherein a position of the third text in the target book content is at an end of each chapter.

According to one or more embodiments of the present disclosure, in the apparatus for information presentation provided in the present disclosure, the apparatus further comprises a deceleration module configured to: in accordance with a determination that the first text is updated to a fourth text, decelerating the updating, wherein the fourth text is located before the first text that meets the predetermined condition, with a second predetermined number of characters between the fourth text and the first text that meets the predetermined condition, and/or wherein the fourth text is located before the third text, with a third predetermined number of characters between the third text and the fourth text.

According to one or more embodiments of the present disclosure, in the apparatus for information presentation provided in the present disclosure, the apparatus further comprises a second update module configured to, after presenting the third text in a suspension state, in accordance with a detection of a second update operation on the third text, determining a real-time ratio of a switched interface corresponding to the second update operation in the reader; and in accordance with a determination that the real-time ratio is greater than a predetermined threshold, updating the third text.

According to one or more embodiments of the present disclosure, in the apparatus for information presentation provided in the present disclosure, the apparatus further comprises a presentation ending module configured to, after presenting recommendation information in a full screen mode in the reader, in accordance with a determination that the recommendation information meets a presentation ending condition, continuing to update the first text based on the target book content.

According to one or more embodiments of the present disclosure, in the apparatus for information presentation provided in the present disclosure, the presentation ending module is configured to: receiving a closing instruction for the recommendation information; and/or, in accordance with a determination that the recommendation information is a recommendation video and playing of the recommendation video is finished; and/or, in accordance with a determination that the recommendation information is predetermined information and a time for presenting the recommendation information reaches a predetermined time, wherein the predetermined information is a recommendation text and/or a recommendation image.

According to one or more embodiments of the present disclosure, the present disclosure provides an electronic device comprising: a processor; and a memory for storing instructions that are executable by the processor; the processor being configured to read the executable instructions from the memory and execute the instructions to implement any of the method for information presentation provided in this disclosure.

According to one or more embodiments of the present disclosure, the present disclosure provides a computer-readable storage medium, and the storage medium has a computer program stored therein, the computer program being configured to perform any of the method for information presentation provided in this disclosure.

The above description is only the preferred embodiment of the present disclosure and an explanation of the technical principles used. Those skilled in the art should understand that the scope of the disclosure involved in this disclosure is not limited to the specific combination of the technical features of the above technical solutions but should also cover other technical solutions formed by any combination of the above technical features or equivalent features without departing from the above disclosure concept. For example, the technical solutions formed by replacing the above features with (but not limited to) technical features with similar functions disclosed in this disclosure.

In addition, although the operations are depicted in a specific order, this should not be understood as requiring these operations to be performed in the specific order shown or in sequential order. Under certain circumstances, multitasking and parallel processing may be advantageous. Similarly, although several specific implementation details are included in the above discussion, these should not be construed as limiting the scope of the present disclosure. Certain features described in the context of individual embodiments may also be implemented in combination in a single embodiment. Conversely, various features described in the context of a single embodiment may also be implemented in a plurality of embodiments individually or in any suitable sub-combination.

While the subject matter has been described in language specific to structural features and/or methodological logical acts, it should be understood that the subject matter defined in the appended claims is not necessarily limited to the particular features or acts described above. Rather, the particular features and acts described above are merely example forms of implementation of the claims.

We claim:

1. A method for digital information presentation, comprising:

receiving an update instruction for a first text currently displayed on a digital reader, wherein the first text is one of a plurality of parts of one or more chapters of a target book content;

updating the first text being displayed on the digital reader based on the target book content;

determining, during the updating, that the first text being displayed on the digital reader meets a predetermined condition;

and in response to determining that the first text meets the predetermined condition, presenting recommendation information in a full screen mode on the digital reader;

wherein the predetermined condition is determined based on text feature information of the first text.

2. The method of claim 1, wherein the text feature information comprises a degree of plot importance;

and wherein the method further comprises determining that the first text meets the predetermined condition by:

determining a target degree of plot importance of the first text;

and determining that the first text meets the predetermined condition based on the target degree of plot importance.

3. The method of claim 2, wherein determining a target degree of plot importance of the first text comprises:

determining an interaction ratio of an amount of interaction data of the first text to a total amount of interaction data of the target book content as the target degree of plot importance.

4. The method of claim 3, wherein determining that the first text meets the predetermined condition based on the target degree of plot importance comprises:

in accordance with a determination that the interaction ratio is lower than a predetermined ratio threshold, determining that the first text meets the predetermined condition.

5. The method of claim 1, wherein the text feature information comprises a position in the target book content;

wherein the method further comprises determining that the first text meets the predetermined condition by:

in accordance with a determination that the position of the first text in the target book content is at an end of a predetermined chapter, determining that the first text meets the predetermined condition.

6. The method of claim 1, wherein the method further comprises determining that the first text meets the predetermined condition by:

in accordance with a determination that a reading duration on the first text by a user is greater than or equal to a predetermined duration, determining that the first text meets the predetermined condition.

7. The method of claim 1, wherein presenting recommendation information in a full screen mode on the digital reader comprises:

sliding a recommendation page into the digital reader until the recommendation page is presented in the full screen mode, and presenting the recommendation information in the recommendation page.

8. The method of claim 7, wherein sliding a recommendation page into the digital reader until the recommendation page is presented in the full screen mode comprises:

dynamically sliding the recommendation page based on an update direction of the first text, and gradually covering the digital reader with the recommendation page during the sliding until the recommendation page is presented in the full screen mode.

9. The method of claim 1, wherein after the first text meets the predetermined condition, the method further comprises:

presenting the recommendation information in a predetermined display region of the digital reader, the predetermined display region being arranged in a wrap-around pattern with the first text.

10. The method of claim 1, wherein after updating the first text based on the target book content, the method further comprises:
    in accordance with a determination that the first text is updated to a second text, wherein the second text is one of the plurality of parts of the one or more chapters of the target book content, presenting prompt information, wherein the prompt information is used to prompt the presenting of the recommendation information, and the second text is located before the first text that meets the predetermined condition, with a first predetermined number of characters between the second text and the first text that meets the predetermined condition.

11. The method of claim 10, wherein the presenting prompt information comprises:
    sliding, based on a predetermined direction, the prompt information into a predetermined position on the digital reader for presentation, the predetermined direction being a direction from a first boundary of the digital reader to a second boundary of the digital reader, and the first boundary being arranged opposite to the second boundary.

12. The method of claim 1, wherein the method further comprises:
    in accordance with a determination that the first text is updated to a third text, wherein the third text is one of the plurality of parts of the one or more chapters of the target book content, creasing the updating, and presenting the third text in a suspension state, wherein a position of the third text in the target book content is at an end of each chapter.

13. The method of claim 12, wherein the method further comprises:
    in accordance with a determination that the first text is updated to a fourth text, wherein the fourth text is one of the plurality of parts of one or more chapters of the target book content, decelerating the updating, wherein the fourth text is located before the first text that meets the predetermined condition, with a second predetermined number of characters between the fourth text and the first text that meets the predetermined condition, and/or wherein the fourth text is located before the third text, with a third predetermined number of characters between the third text and the fourth text.

14. The method of claim 12, wherein after presenting the third text in a suspension state, the method further comprises:
    in accordance with a detection of a second update operation on the third text, determining a real-time ratio of a switched interface corresponding to the second update operation on the digital reader;
    and in accordance with a determination that the real-time ratio is greater than a predetermined threshold, updating the third text.

15. The method of claim 1, wherein after presenting recommendation information in a full screen mode on the digital reader, the method further comprises:
    in accordance with a determination that the recommendation information meets a presentation ending condition, continuing to update the first text based on the target book content.

16. The method of claim 15, wherein determining that the recommendation information meets an ending presentation condition comprises:
    receiving a closing instruction for the recommendation information;
    and/or, in accordance with a determination that the recommendation information is a recommendation video and playing of the recommendation video is finished;
    and/or, in accordance with a determination that the recommendation information is predetermined information and a time for presenting the recommendation information reaches a predetermined time, wherein the predetermined information is a recommendation text and/or a recommendation image.

17. An electronic device comprising:
    a processor;
    and a memory for storing instructions that are executable by the processor;
    wherein the processor is configured to read the executable instructions from the memory and execute the instructions to perform acts comprising:
    receiving an update instruction for a first text currently display on a digital reader, wherein the first text is one of a plurality of parts of one or more chapters of a target book content;
    updating the first text being displayed on the digital reader based on the target book content;
    determining, during the updating, that the first text being displayed on the digital reader meets a predetermined condition;
    and in response to determining that the first text meets the predetermined condition, presenting recommendation information in a full screen mode on the digital reader;
    wherein the predetermined condition is determined based on text feature information of the first text.

18. The electronic device of claim 17, wherein the text feature information comprises a degree of plot importance;
    the first text meeting the predetermined condition comprising:
    determining a target degree of plot importance of the first text;
    and determining that the first text meets the predetermined condition based on the target degree of plot importance.

19. The electronic device of claim 18, wherein determining a target degree of plot importance of the first text comprises:
    determining an interaction ratio of an amount of interaction data of the first text to a total amount of interaction data of the target book content as the target degree of plot importance.

20. A non-transitory computer-readable storage medium, wherein the storage medium has a computer program stored therein, and when executed by a processor, the computer program is configured to perform acts comprising:
    receiving an update instruction for a first text currently displayed on a digital reader, wherein the first text is one of a plurality of parts of one or more chapters of a target book content;
    updating the first text being displayed on the digital reader based on the target book content;
    determining, during the updating, that the first text being displayed on the digital reader meets a predetermined condition;
    and in response to determining that the first text meets the predetermined condition, presenting recommendation information in a full screen mode on the digital reader;

wherein the predetermined condition is determined based on text feature information of the first text.

* * * * *